(12) United States Patent
Miyata

(10) Patent No.: US 8,307,387 B2
(45) Date of Patent: Nov. 6, 2012

(54) DISK CASE AND DETERMINING METHOD THEREOF

(75) Inventor: Koji Miyata, Ehime (JP)

(73) Assignee: Panasonic Corporation, Osaka (JP)

( * ) Notice: Subject to any disclaimer, the term of this patent is extended or adjusted under 35 U.S.C. 154(b) by 317 days.

(21) Appl. No.: 12/749,704

(22) Filed: Mar. 30, 2010

(65) Prior Publication Data

US 2011/0247025 A1    Oct. 6, 2011

(51) Int. Cl.
*G11B 23/03*    (2006.01)
(52) U.S. Cl. ........................................................ 720/729
(58) Field of Classification Search ............... 369/291.1; 720/725, 727, 728, 729
See application file for complete search history.

(56) References Cited

U.S. PATENT DOCUMENTS

| | | | | |
|---|---|---|---|---|
| 6,366,553 B1 * | 4/2002 | Takahashi | ...................... | 720/737 |
| 6,907,614 B2 * | 6/2005 | Sawada et al. | ................ | 720/739 |
| 7,793,315 B2 * | 9/2010 | Asakura et al. | ................ | 720/740 |
| 2005/0273800 A1 * | 12/2005 | Park et al. | ...................... | 720/733 |

FOREIGN PATENT DOCUMENTS

| | | | |
|---|---|---|---|
| JP | 09265756 A | * | 10/1997 |
| JP | 10340556 A | * | 12/1998 |
| JP | 2001210047 A | * | 8/2001 |
| JP | 2002117640 A | * | 4/2002 |
| JP | 2003077246 A | * | 3/2003 |
| JP | 2005243102 A | * | 9/2005 |
| JP | 2007080449 A | * | 3/2007 |

* cited by examiner

*Primary Examiner* — Will J Klimowicz
(74) *Attorney, Agent, or Firm* — RatnerPrestia

(57) ABSTRACT

It is an object of the invention to provide a disk case capable of easily determining a disk without changing hardware of a drive unit. A disk case of the present invention includes a case body in which a disk is held, an opening through which a portion of the disk is exposed, a shutter for opening and closing the opening, and a bridge portion located at an outer periphery of the disk and at the opening, wherein a dent having a diameter greater than an inner peripheral diameter of the bridge portion is formed at a position of a pickup moving path of the bridge portion.

4 Claims, 4 Drawing Sheets

DISK CASE AND DETERMINING METHOD THEREOF

TECHNICAL FIELD

The present invention relates to a disk case in which a disk is held, and to a determining method thereof.

BACKGROUND TECHNIQUE

A conventional disk case will be described using FIG. 4. FIG. 4 is a perspective view of the conventional disk case.

A case body 10 in which a disk (not shown) is held has an opening 11 from which a portion of the disk is exposed. The case body 10 includes a shutter 12 for opening and closing the opening 11.

Since disks having different recording or playback systems are accommodated and utilized in the disk case of this kind, the case body 10 has holes 13 through which it is possible to determine a kind of the held disk and to determine whether the disk is writable.

Patent document 1 also discloses a disk case of this kind.
[Patent Document 1] Japanese Patent Application Laid-open No. 2003-45141 (especially FIG. 3)

However, when a kind of a disk is determined through the holes 13 formed in the case body 10 in this manner, it is necessary to provide a drive with a function for detecting the holes 13.

That is, since the holes 13 of the case body 10 can not alone determine the kind of a disk, there is a problem that a structure of a drive unit must be changed, i.e., by providing a detection switch in the drive unit.

DISCLOSURE OF THE INVENTION

Hence, it is an object of the present invention to provide a disk case capable of easily determining a disk without changing a structure of a drive unit.

First aspect of the invention provides a disk case including a case body in which a disk is held, an opening through which a portion of the disk is exposed, a shutter for opening and closing the opening, and a bridge portion located at an outer periphery of the disk and at the opening, wherein in a state where the case body is attached to a drive unit, the opening is disposed in a path through which a pickup of the drive unit moves, and in a state where the disk is held by the case body, the bridge portion is located at the outer periphery of the disk, a dent is formed in an inner peripheral surface of the bridge portion, and the dent is disposed in the path through which the pickup moves.

According to a second aspect, in the disk case of the first aspect, the inner peripheral surface of the bridge portion is formed into an arc shape, AND a width of the dent has such a value that a lens and a lens protector constituting the pickup do not hit the bridge portion.

According to a third aspect, in the disk case of the first aspect, a projection is formed on an outer periphery of the bridge portion corresponding to the dent.

A fourth aspect of the invention provides a disk determining method of disk cases each including a case body in which a disk is held, an opening through which a portion of the disk is exposed, a shutter for opening and closing the opening, and a bridge portion located at an outer periphery of the disk and at the opening, wherein a kind of a disk held in the disk case having a dent at a position of a path through which a pickup of the bridge portion moves and a kind of a disk held in the disk case having no dent at a position of the path through which the pickup of the bridge portion moves are different from each other.

According to a fifth aspect, in the disk determining method of disk cases of the fourth aspect, it is determined whether the disk is writable by determining processing by means of software based on data that was read by the pickup.

A sixth aspect of the invention provides a disk determining method of disk cases each including a case body in which a disk is held, an opening through which a portion of the disk is exposed, a shutter for opening and closing the opening, and a bridge portion located at an outer periphery of the disk and at the opening, wherein in a state where the case body is attached to a drive unit, the opening is disposed in a path through which a pickup of the drive unit moves, and in a state where the disk is held by the case body, the bridge portion is located at the outer periphery of the disk, a dent is formed in an inner peripheral surface of the bridge portion, the dent is disposed in the path through which the pickup moves, a difference between a kind of a disk in a disk case having the dent and a kind of a disk in a disk case having no dent is determined by determining processing by means of software based on data that was read by the pickup.

According to a seventh aspect, in the disk determining method of disk cases of the sixth aspect, it is determined by the detent that the disk is writable.

According to the disk case of the present invention, it is possible to determine a disk by the pickup by providing the bridge portion with the dent.

According to the disk case of the first and second aspects of the invention, in a state where the case body is attached to the drive unit, the opening is located on the path through which the pickup of the drive unit moves, and in a state where the disk is held by the case body, the bridge portion is located on the outer periphery of the disk, the dent is formed on the inner peripheral surface of the bridge portion, and the dent is located on the path through which the pickup moves. Further, the inner peripheral surface of the bridge portion is formed into an arc shape, and a width of the dent has such a value that a lens and a lens protector constituting the pickup do not hit the bridge portion. According to these aspects, a disk can be determined by the pickup by providing the bridge portion with the dent. Therefore, it is possible to determine a disk only by changing software of the drive unit without changing a structure of the drive unit.

According to the third aspect, in the disk case of the first aspect, the projection is formed on the outer periphery of the bridge portion corresponding to the dent. According to the second aspect, a problem of strength poverty caused by the dent can be overcome.

According to the disk determining method of disk cases in the fourth aspect, a kind of a disk held in a disk case having a dent at a location of the path through which the pickup of the bridge portion moves, and a kind of a disk held in a disk case having no dent at the location of the path through which the pickup of the bridge portion moves are different from each other, and the kind of the disk is determined based on the dent. According to this aspect, it is possible to determine the disk only by changing the software of the drive unit.

According to the fifth aspect of the invention, in the disk determining method of disk cases of the fourth aspect, it is determined whether the disk is writable by determining processing by means of software based on data that was read by the pickup. According to this aspect, it is possible to determine whether a disk is writable only by changing the software of the drive unit.

According to the disk determining method of disk cases in the sixth aspect, a difference between a kind of a disk in a disk case having the dent and a kind of a disk in a disk case having no dent is determined by determining processing by means of software based on data that was read by the pickup. According to this aspect, it is possible to determine the disk only by changing the software of the drive unit.

According to the seventh aspect of the invention, in the disk determining method of disk cases of the sixth aspect, it is determined whether a disk is writable by the dent. According to this aspect, it is possible to determine whether a disk is writable only by changing the software of the drive unit.

BEST MODE FOR CARRYING OUT THE INVENTION

Figure 1:
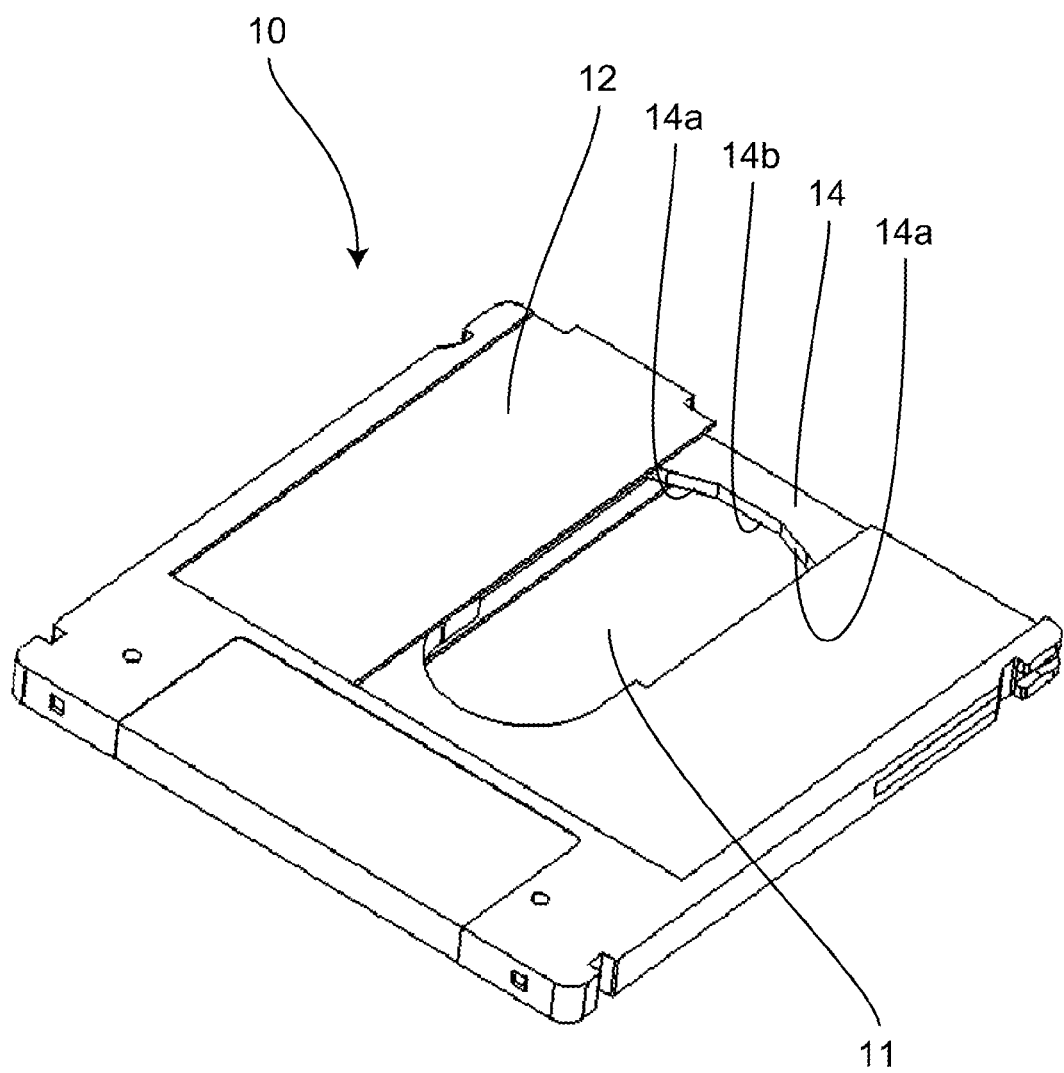
FIG. 1 is a perspective view of a disk case according to an embodiment of the present invention.
Figure 2:
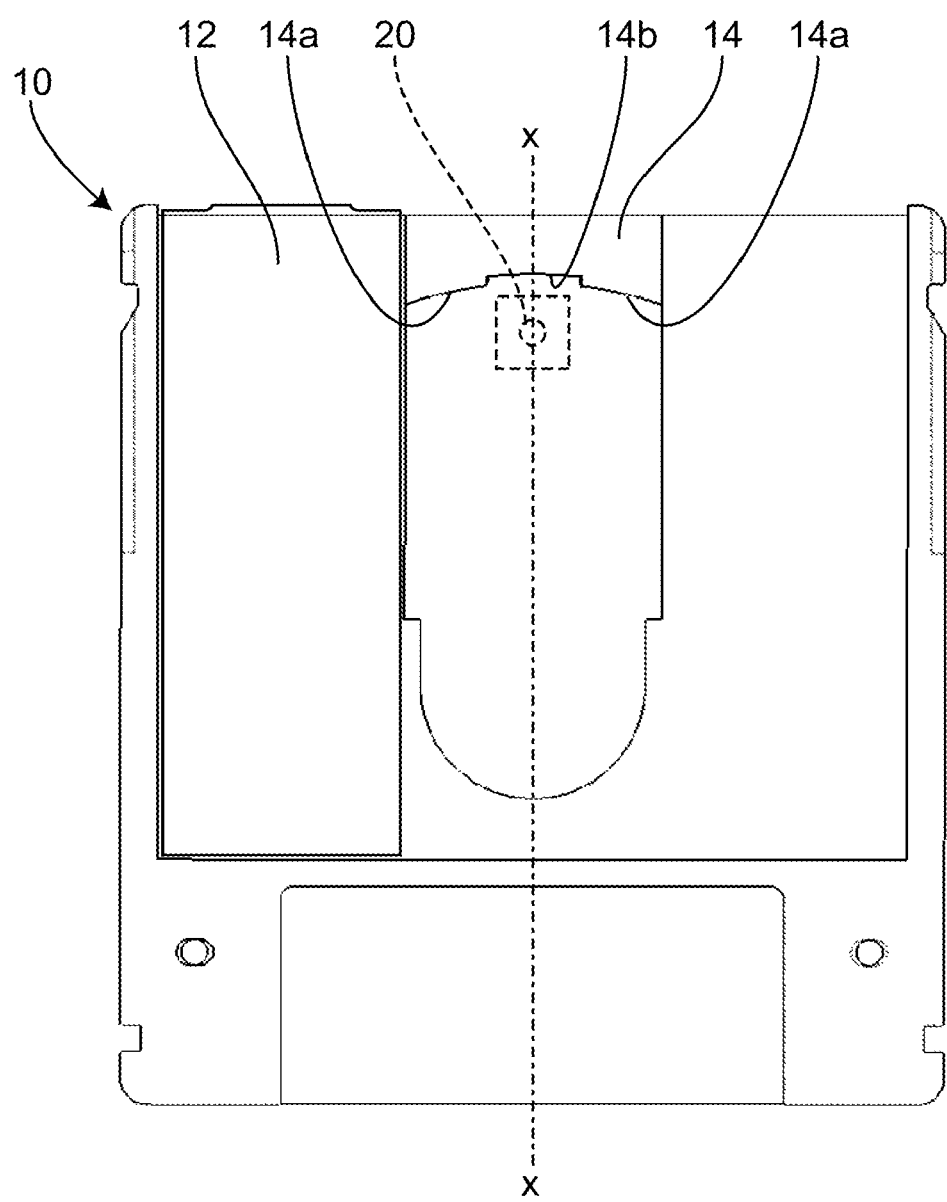
FIG. 2 is a plan view of the disk case.

Embodiments of the present invention will be explained with reference to the drawings. FIG. 1 is a perspective view of a disk case according to an embodiment of the invention. FIG. 2 is a plan view of the disk case.

A case body 10 holds a disk (not shown) therein. An opening 11 through which a portion of the disk is exposed is formed in the case body 10. The case body 10 includes a shutter 12 for opening and closing the opening 11, and a bridge portion 14 located at the opening 11. The bridge portion 14 is located at an outer periphery of the case body 10. Therefore, in a state where a disk is held in the case body 10, the bridge portion 14 is located at the outer periphery of the disk. An inner peripheral surface 14a of the bridge portion 14 is formed into an arc shape. The inner peripheral surface 14a of the bridge portion 14 is opposed to a center of the case body 10. Here, the center of the case body 10 is a rotation center of the disk in a state where the disk is held in the case body 10.

As shown in FIG. 2, in a state where the case body 10 is attached to a drive unit, the opening 11 is disposed in a path through which a pickup 20 of the drive unit moves. That is, the pickup 20 is located at the opening 11. The path through which the pickup 20 moves is on a broken line x.

A dent 14b is formed in the inner peripheral surface 14a of the bridge portion 14. The dent 14b is provided in the path x through which the pickup 20 moves. A distance between the center of the case body 10 (rotation center of the disk) to the dent 14b is longer than a distance from the center of the case body 10 to the inner peripheral surface 14a of the bridge portion 14. A width of the dent 14b (a direction perpendicular to the broken line x) has such a size that a lens and a lens protector constituting the pickup 20 do not hit the bridge portion 14.

According to this embodiment, the dent 14b is provided in the bridge portion 14. A kind of a disk held in the disk case having the dent 14b at a position of the path through which the pickup 20 of the bridge portion 14 moves and a kind of a disk held in the disk case having no dent 14b at a position of the path through which the pickup 20 of the bridge portion 14 moves are different from each other. And the kind of the disk in the disk case having the dent 14b and the kind of the disk in the disk case having no dent 14b are determined by the determining processing by means of software based on data that was read by the pickup 20. Therefore, it is possible to determine a disk only by changing software of the drive unit.

Therefore, a kind of a disk held in a disk case having no dent 14b and a kind of a disk held in a disk case having the dent 14b are different from each other, or a kind of a disk held in the disk case is different depending upon a depth of the dent 14b. With this, it is possible to determine a kind of a disk, and whether a disk is writable.

Figure 3:
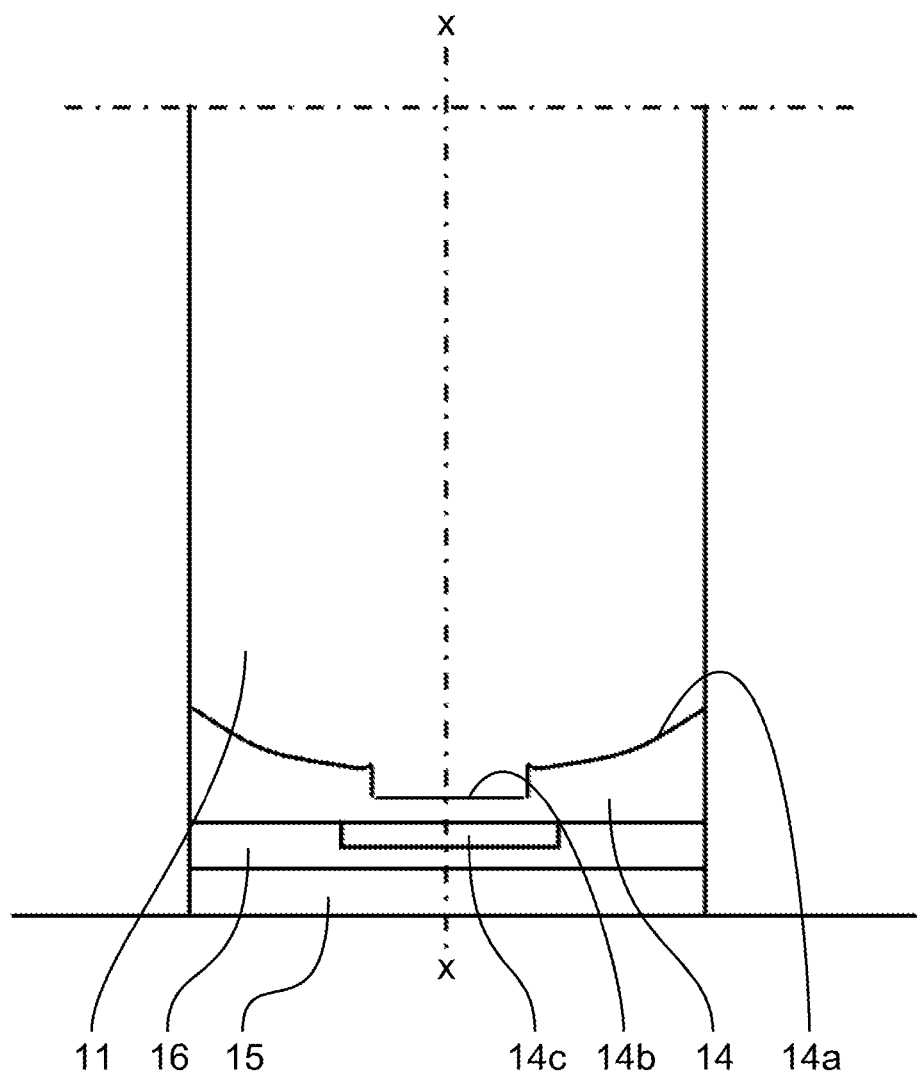
FIG. 3 is an enlarged plan view of a disk case according to another embodiment of the invention.
Figure 4:
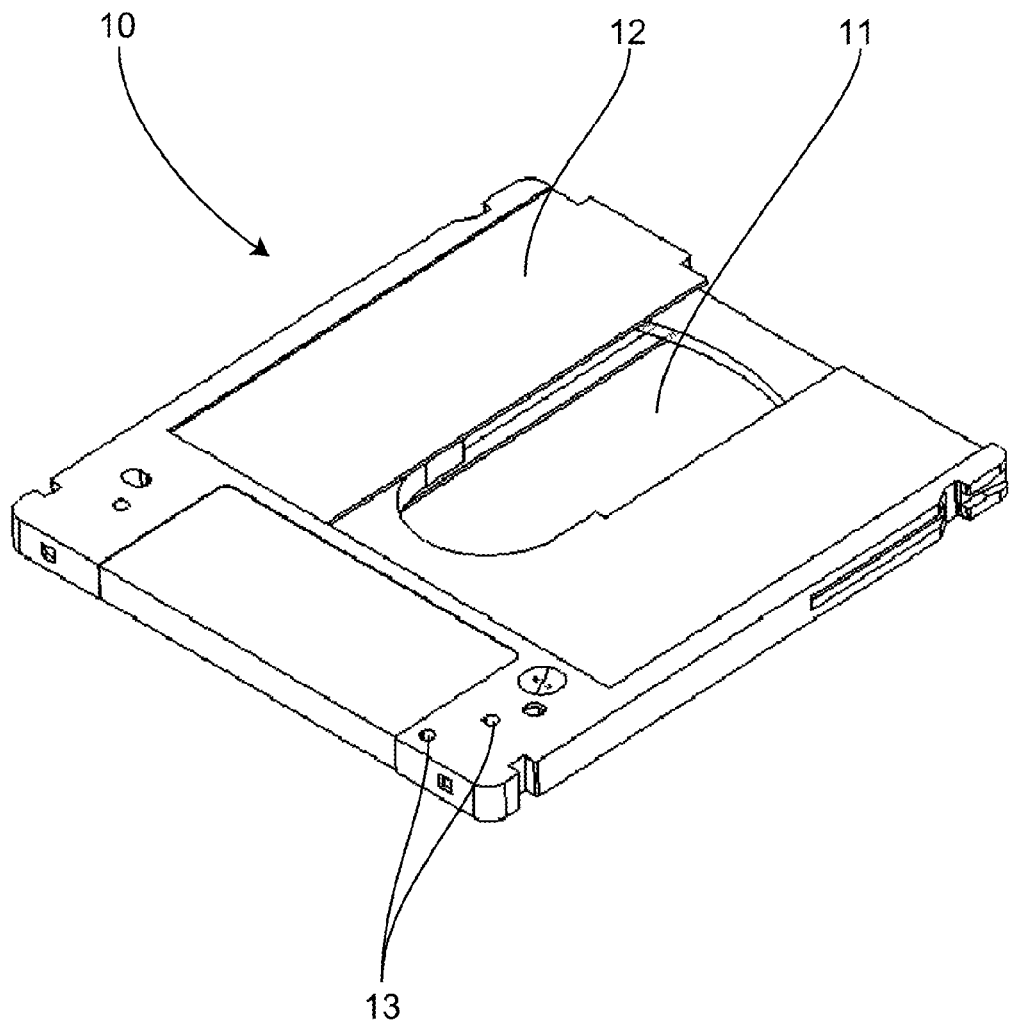
FIG. 4 is a perspective view of a conventional disk case.

FIG. 3 is an enlarged plan view of an essential portion of a disk case according to another embodiment of the invention. Other structure that is not illustrated is the same as that of the above embodiment.

In this embodiment, a projection 14c is formed on the bridge portion 14 at its outer periphery corresponding to the dent 14b. With this, a problem of strength poverty caused by the dent 14b can be overcome. In this embodiment, a groove 16 is provided in the bridge portion 14, thereby forming a connecting portion 15 outward. The groove 16 functions as a restricting groove of a sliding pawl (not shown) of the shutter 12.

According to the embodiment, by providing the dent 14b in the bridge portion 14, and by determining a disk by the pickup 20, it is possible to determine a disk only by changing software of the drive unit.

According to the embodiment, by forming the projection 14c on the outer periphery of the bridge portion 14 corresponding to the dent 14b, the problem of strength poverty caused by the dent 14b can be overcome.

According to the embodiment, it is possible to determine a disk only by changing the software of the drive unit.

According to a disk case of the present invention, disks of different kinds can be accommodated, and the disk cases can be used as cases in which disks that are different not only in recording and playback systems but also in file types are accommodated.

What is claimed is:

1. A disk determining method of disk cases each comprising a case body in which a disk is held, an opening through which a portion of said disk is exposed, a shutter for opening and closing said opening, and a bridge portion located at an outer periphery of said disk and at said opening, wherein
a kind of a disk held in said disk case having a dent at a position of a path through which a pickup of said bridge portion moves and a kind of a disk held in said disk case having no dent at a position of said path through which said pickup of said bridge portion moves are different from each other.

2. The disk determining method of disk cases according to claim 1, wherein it is determined whether said disk is writable by determining processing by means of software based on data that was read by said pickup.

3. A disk determining method of disk cases each comprising a case body in which a disk is held, an opening through which a portion of said disk is exposed, a shutter for opening and closing said opening, and a bridge portion located at an outer periphery of said disk and at said opening, wherein
in a state where said case body is attached to a drive unit, said opening is disposed in a path through which a pickup of said drive unit moves, and
in a state where said disk is held by said case body, said bridge portion is located at the outer periphery of said disk, a dent is formed in an inner peripheral surface of said bridge portion, said dent is disposed in said path through which said pickup moves, a difference between a kind of a disk in a disk case having said dent and a kind of a disk in a disk case having no dent is determined by determining processing by means of software based on data that was read by said pickup.

4. The disk determining method of disk cases according to claim 3, wherein it is determined whether said disk is writable.

* * * * *